(12) United States Patent
Golgolab et al.

(10) Patent No.: US 8,699,179 B1
(45) Date of Patent: Apr. 15, 2014

(54) HERMETICALLY SEALED DISK DRIVE WITH FILL PORT VALVE

(71) Applicant: Western Digital Technologies, Inc., Irvine, CA (US)

(72) Inventors: Arman V. Golgolab, Los Altos, CA (US); Jon E. Jacoby, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/826,244

(22) Filed: Mar. 14, 2013

(51) Int. Cl.
*G11B 33/14* (2006.01)
(52) U.S. Cl.
USPC .............. 360/97.22; 360/97.12; 251/310
(58) Field of Classification Search
USPC .......... 360/97.12, 97.22, 99.21, 99.18, 99.16; 251/309–312
See application file for complete search history.

(56) References Cited

U.S. PATENT DOCUMENTS

| | | | |
|---|---|---|---|
| 3,050,080 A * | 8/1962 | Pagano | ............ 137/614.17 |
| 6,644,362 B2 | 11/2003 | Bernett | |
| 6,831,811 B1 | 12/2004 | Andrikowich et al. | |
| 7,570,454 B1 | 8/2009 | Andrikowich et al. | |
| 7,876,526 B2 | 1/2011 | Calderon et al. | |
| 7,914,858 B1 | 3/2011 | deJesus et al. | |
| 8,199,425 B1 | 6/2012 | Gustafson et al. | |
| 8,248,724 B2 | 8/2012 | Hayakawa et al. | |
| 2012/0097879 A1 * | 4/2012 | Gilbert | .................. 251/309 |

FOREIGN PATENT DOCUMENTS

JP  04247387 A  *  9/1992

* cited by examiner

*Primary Examiner* — Will J Klimowicz

(57) ABSTRACT

A novel disk drive includes an enclosure and a disk rotatably mounted to and within the enclosure. The disk drive enclosure has a fill port opening with an internally threaded section and an internal annular seating surface. A fill port valve is disposed within the fill port opening. The fill port valve includes an externally threaded section that is engaged with the internally threaded section of the fill port opening, an external annular seating surface in contact with and forming a continuous annular seal with the internal annular seating surface of the fill port opening, and a gas flow channel spanning the externally threaded section of the fill port valve. The disk drive may be helium-filled, and may also include a metal foil seal that is externally adhered to the disk drive enclosure and covers the fill port opening and the fill port valve.

12 Claims, 7 Drawing Sheets

HERMETICALLY SEALED DISK DRIVE WITH FILL PORT VALVE

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator rotates to position the HGAs adjacent desired information tracks on the disk. The actuator typically includes a pivot-bearing cartridge to facilitate such rotational positioning. The pivot-bearing cartridge typically fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a minor and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities.

Disk drive enclosures disclosed in the art to contain a gas other than air (or in addition to air) are typically hermetically sealed to prevent an unacceptable rate of gas leakage. Although some negligible amount of gas leakage may be unavoidable, a non-negligible amount of gas leakage is undesirable because it can alter the thickness of the gas lubrication film between the head and the disk, and thereby affect the performance of the head. A non-negligible amount of gas leakage is also undesirable because it can alter the tribochemistry of the head disk interface, possibly leading to degradation in reliability, head crashes, and associated data loss.

Conventional hard disk drives, especially ones that contain a gas other than air, may have a port through the enclosure to introduce the gas (with the port being sealed after filling). However, if the disk drive loses the gas due to a leak, and the leak is repaired, the disk drive may need to be refilled with the gas. This can present a problem if the fill port cannot be conveniently or practically reopened and/or resealed.

For example, one conventional method to seal the fill port is by forcing a polished stainless steel ball into a slightly undersized cylindrical hole in the disk drive enclosure. The interference fit between the ball and the hole can seal the gas within the disk drive. However, if the gas later leaks out and the disk drive needs to be re-filled, then the ball must be removed by either pressing the ball through to the interior of the disk drive (which requires then opening the disk drive to retrieve the ball), or else opening the disk drive to press the ball through to the exterior. Either option would typically undesirably require the disk drive cover to be removed and replaced, and would require manufacturing personnel to keep track of the loose and relatively small ball component.

Therefore, there is a need in the art for improved structures and methods for re-filling a disk drive enclosure with a gas, and then re-sealing the disk drive.

DESCRIPTION OF THE PREFERRED EMBODIMENTS

Figure 1:
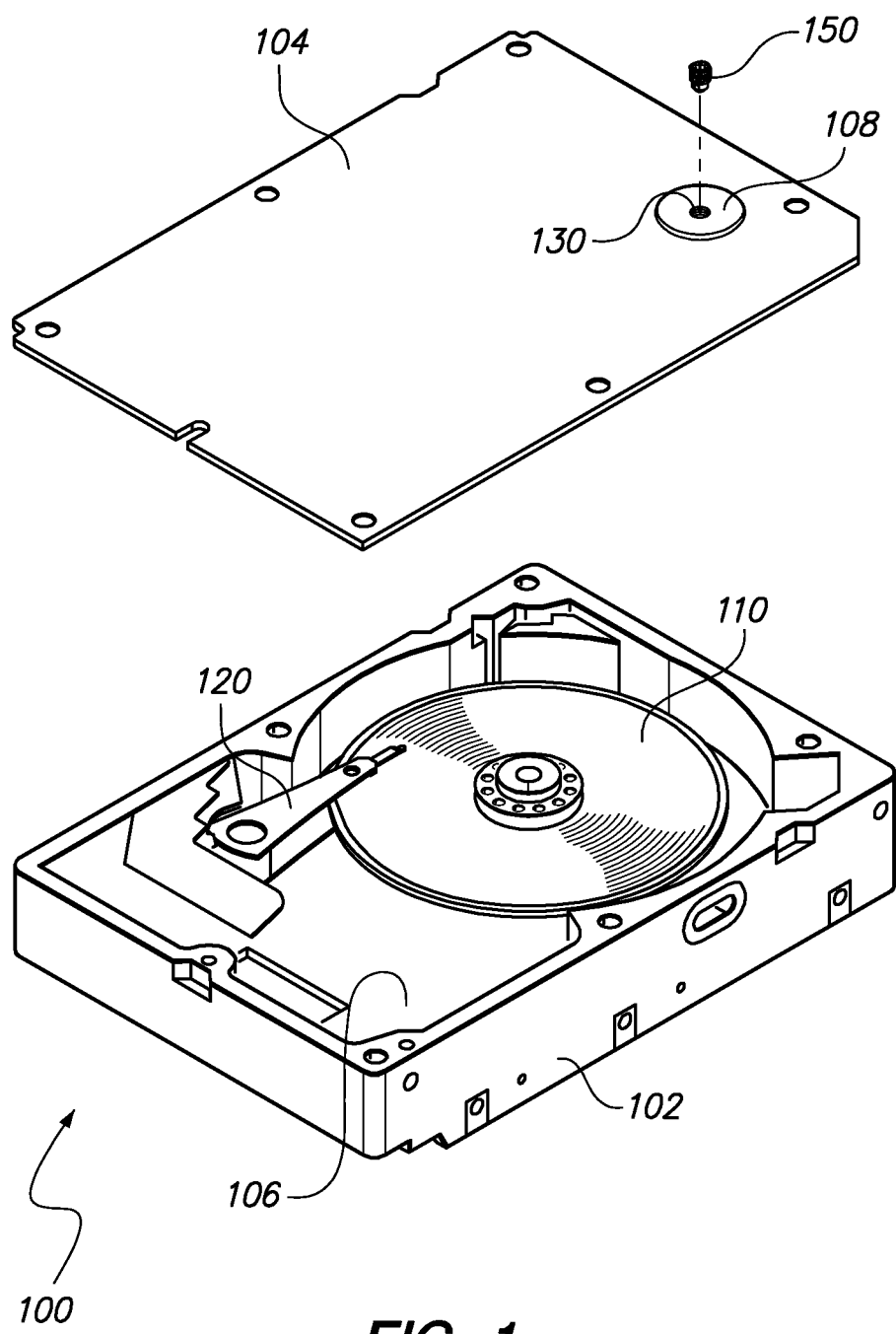
FIG. 1 is a perspective exploded view of a disk drive according to an embodiment of the present invention.

FIG. 1 is a perspective exploded view of a disk drive 100 according to an embodiment of the present invention. The disk drive 100 includes a disk drive base 102, and a disk drive cover 104, that together form a disk drive enclosure 106. At least one disk 110 is rotatably mounted to the disk drive base 102, within the disk drive enclosure 106. The disk drive 100 also includes a head actuator 120 for positioning a head at desired positions over the major surface of the disk 110.

Although in the view of FIG. 1 the disk drive cover 104 is exploded away from the disk drive base 102 to show some internal components of the disk drive 100, in the assembled disk drive 100 the disk drive cover 104 is preferably sealed to the disk drive base 102, continuously around its periphery. In this context, being sealed continuously around its periphery implies that a sealant layer (e.g. adhesive, solder, a polymer gasket material) continuously encircles the interior of the disk drive enclosure 106 from which an internal gas might otherwise escape or external contaminants might otherwise enter.

In the embodiment of FIG. 1, a gas (e.g. helium, nitrogen, methane, air, argon, neon, etc) may be introduced into the enclosure 106 of the disk drive 100. Then, if the interior of the disk drive enclosure contains a substantial concentration of that gas, the disk drive 100 would be considered to be "filled" with that gas. For example, if the interior of the disk drive enclosure then contains a substantial concentration of helium, the disk drive 100 would be considered to be helium-filled.

Practically, the concentration of an enclosed gas (e.g. helium) versus remaining air would be less than 100% initially, and would expected to drop over the useful life of the disk drive 100 due to non-zero leakage. Still, in the case of helium, the disk drive 100 may be considered helium-filled throughout its useful life so long as it continues to enclose a substantial concentration of helium gas. Note also that 1.0 atmosphere pressure of helium is not required for the disk drive 100 to be considered to enclose helium and/or be helium-filled. For example, a helium-filled disk drive enclosure may preferably initially enclose helium having between 0.3 to 1.0 atmosphere partial pressure, and may also enclose air having between 0 to 0.7 atmosphere partial pressure.

In the embodiment of FIG. 1, the disk drive enclosure 106 has a fill port opening 130, and a fill port valve 150 that is shown exploded away, but that would be within the fill port opening 130 after assembly and during use. Note that the fill port opening 130 may be through the disk drive cover 104, or alternatively through the disk drive base 102. In either case, the disk drive enclosure 106 may be optionally locally thickened near the fill port opening 130, for example to ensure that the fill port opening 130 has adequate length to accommodate certain features of the fill port opening 130 and/or the fill port valve (which features are disclosed and described in subsequent paragraphs herein). For example, the disk drive cover 104 is shown to include a locally thickened region 108 around the fill port opening 130. In certain embodiments, the disk drive enclosure 106 may have a thickness adjacent the fill port opening 130 that is preferably at least 2 mm.

Figure 2:
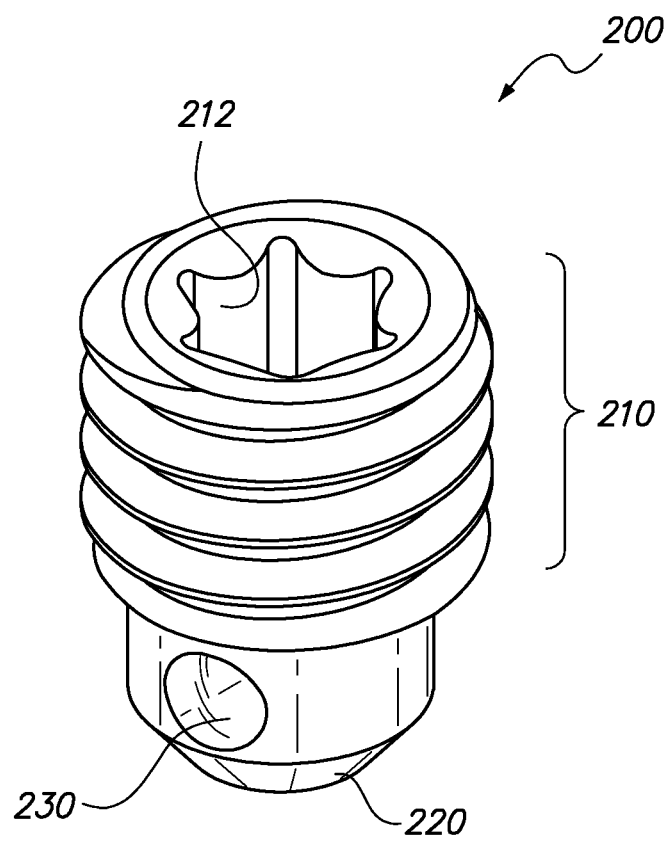
FIG. 2 is a perspective view of a fill port valve according to an embodiment of the present invention.

FIG. 2 is a perspective view of a fill port valve 200 according to an embodiment of the present invention. The fill port valve 200 includes an externally threaded section 210 and an external annular seating surface 220. The external annular seating surface 220 of the fill port valve 200 may optionally be a beveled (i.e. linearly tapered in cross-section) surface or alternatively a curved (e.g. spherical) surface. In this context, the term "annular" excludes a threaded surface (e.g. the threads of the externally threaded section 210, because an annulus must rejoin itself in a complete circle when traveling around 360 degrees, while a thread is spiral in shape and does not rejoin itself when traveling around 360 degrees. The fill port valve 200 also includes a gas flow channel 230, which in the embodiment of FIG. 2 is in fluid connection with an optional faceted torque-receiving recession 212.

Figure 3A:
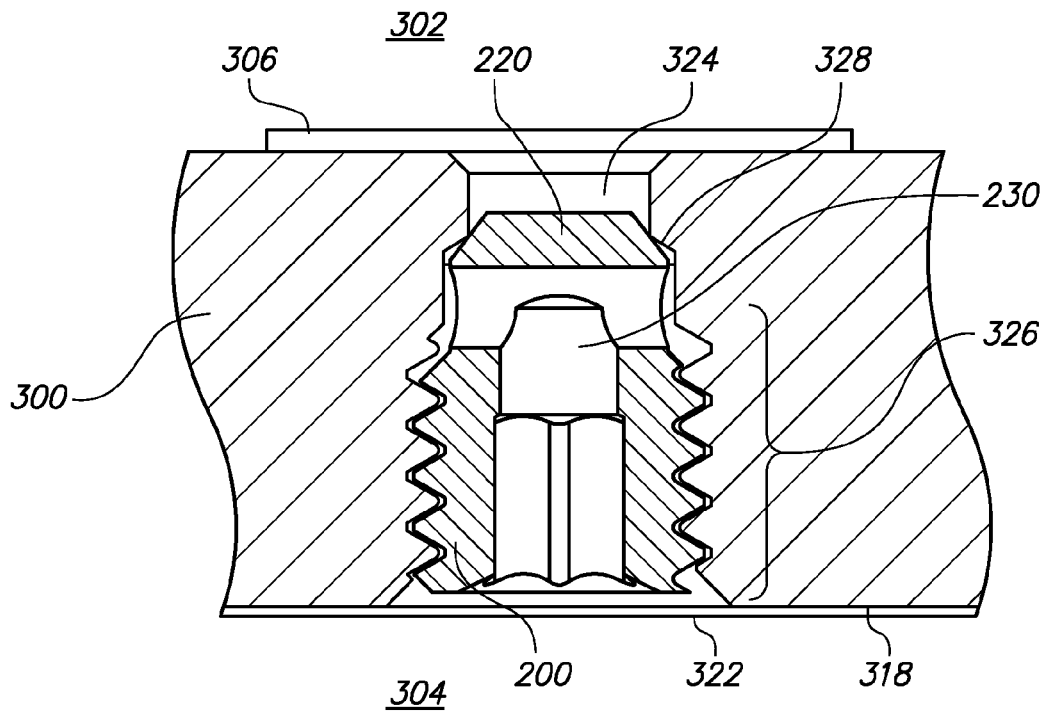
FIG. 3A is a cross-sectional view of a fill port valve in a closed position, according to an embodiment of the present invention.
Figure 3B:
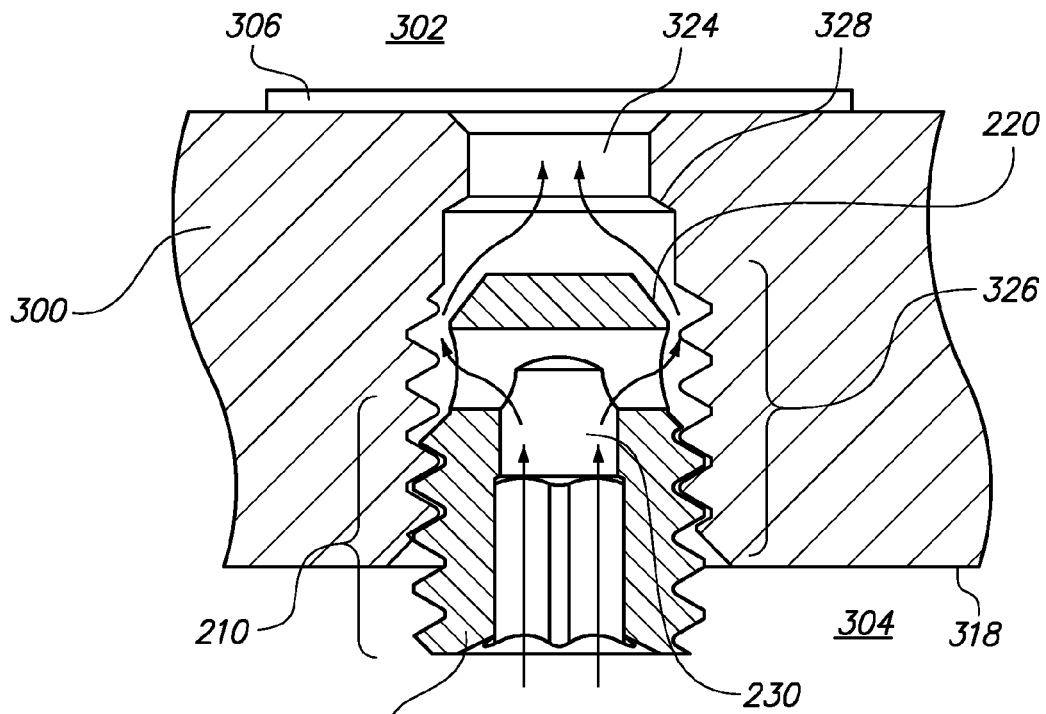
FIG. 3B is a cross-sectional view of the fill port valve of FIG. 3A, except in an open position.

FIG. 3A is a cross-sectional view of the fill port valve 200 in a closed position, according to an embodiment of the present invention. FIG. 3B is a cross-sectional view of the fill port valve 200 in an open position. Now referring to FIGS. 2, 3A, and 3B, a fill port opening 324 includes an internally threaded section 326 and an internal annular seating surface 328. The externally threaded section 210 of the fill port valve 200 is engaged with the internally threaded section 326 of the fill port opening 324. The internal annular seating surface 328 of the fill port opening 324 is preferably but not necessarily a beveled (i.e. linearly tapered in cross-section) surface.

In the embodiment of FIGS. 2, 3A, and 3B, the gas flow channel 230 spans the externally threaded section 210 of the fill port valve 200. In this context to "span" the externally threaded section 210 means to traverse the externally threaded section 210, so as to bypass the externally threaded section 210. In the embodiment of FIGS. 2, 3A, and 3B, the gas flow channel 230 includes an internal bore that passes through the fill port valve 200, within the externally threaded section 210. Note that the gas flow channel 230 does not extend to and does not extend beyond or span or bypass the external annular seating surface 220 of the fill port valve 200, as otherwise the fill port valve 200 could not prevent gas flow in the closed position (shown in FIG. 3A).

In the embodiment of FIGS. 3A and 3B, a gas-permeable filter 306 optionally spans the fill port opening 324. When the fill port valve 200 is in the open position, as shown in FIG. 3B, gas may flow into the interior 302 of the disk drive enclosure 300 as shown by the depicted arrows, or out to the exterior 304 of the disk drive enclosure 300 (which would be a flow in the opposite direction than shown by the depicted arrows), through the gas-permeable filter 306.

However, when the fill port valve 200 is in the closed position, as shown in FIG. 3A, the external annular seating surface 220 of the fill port valve 200 contacts with and forms a continuous annular seal with the mating internal annular seating surface 328 of the fill port opening 324. In such position, the contact of the external annular seating surface 220 of the fill port valve 200 with the internal annular seating surface 328 of the fill port opening 324, prevents any flow of gas (e.g. helium, nitrogen, methane, air, argon, neon, etc).

Note that in the embodiment of FIGS. 3A and 3B, the internally threaded section 326 of the fill port opening 324 is disposed closer to the exterior 304 of the disk drive enclosure 300 than is the continuous annular seal (between the external annular seating surface 220 of the fill port valve 200 and the internal annular seating surface 328 of the fill port opening 324). After the fill port valve 200 is closed, as shown in FIG. 3A, a further adhered seal 322 (e.g. that includes a metal foil) may optionally cover the fill port opening 324 and the fill port valve 200. The adhered seal 322 is shown in FIG. 3A to be adhered to an external surface 318 of the disk drive enclosure 300.

For example, the adhered seal 322 may be a portion of a top cover label seal that includes a metal foil having a thickness that is preferably in the range 12 to 150 microns, so that small pores and/or imperfections in the continuous metal foil will be unlikely to frequently pass all the way through the layer. Alternatively, the adhered seal 322 may comprise a polymer backing layer and a metal film deposited on the polymer backing layer, with the metal film having a metal film thickness in the range 0.1 to 5 microns. The adhered seal 322 may include a thermal set epoxy adhesive or an acrylic pressure sensitive adhesive, for example. Such adhesive may have a thickness in the range 5 to 50 microns. Alternatively, the adhered seal 322 may include two overlapping layers of continuous metal foil, so that any small pores or imperfections that exist in one of the continuous metal foil layers will be unlikely to be aligned with any small pores or imperfections in the other (overlapping) one of the continuous metal foil layers.

Figure 4:
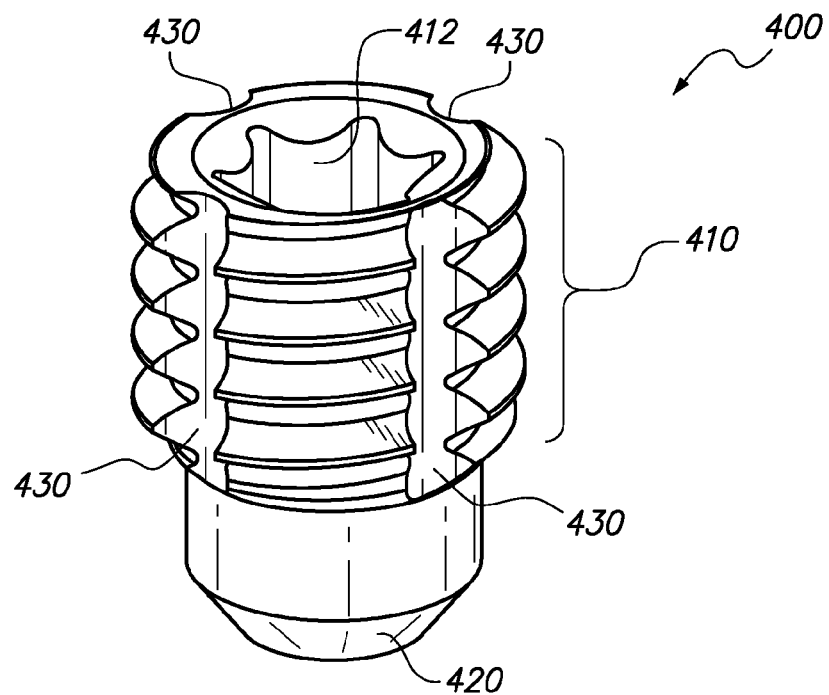
FIG. 4 is a perspective view of a fill port valve according to another embodiment of the present invention.

FIG. 4 is a perspective view of a fill port valve 400 according to another embodiment of the present invention. The fill port valve 400 includes an externally threaded section 410 and an external annular seating surface 420. The external annular seating surface 420 of the fill port valve 400 may optionally be a beveled (i.e. linearly tapered in cross-section) surface or alternatively a curved (e.g. spherical) surface. Note that in this context a spherical surface does not have to be part of a complete sphere, and indeed in this embodiment could not practically be part of a complete sphere. The fill port valve 400 also optionally includes a faceted torque-receiving recession 412, which in the embodiment of FIG. 4 is a blind recession.

In the embodiment of FIG. 4, the fill port valve 400 also includes a plurality of gas flow channels 430, each spanning the externally threaded section 410. In the embodiment of FIG. 4, the gas flow channels 430 are external longitudinal grooves that traverse the threaded section 410, formed by locally grinding or milling away the threads of the threaded section 410. In this way, the gas flow channels 430 reduce the resistance to gas flow that would otherwise be presented by the threads at their locations. Note that the gas flow channels 430 do not extend to and do not extend beyond the external annular seating surface 420 of the fill port valve 400.

Figure 5:
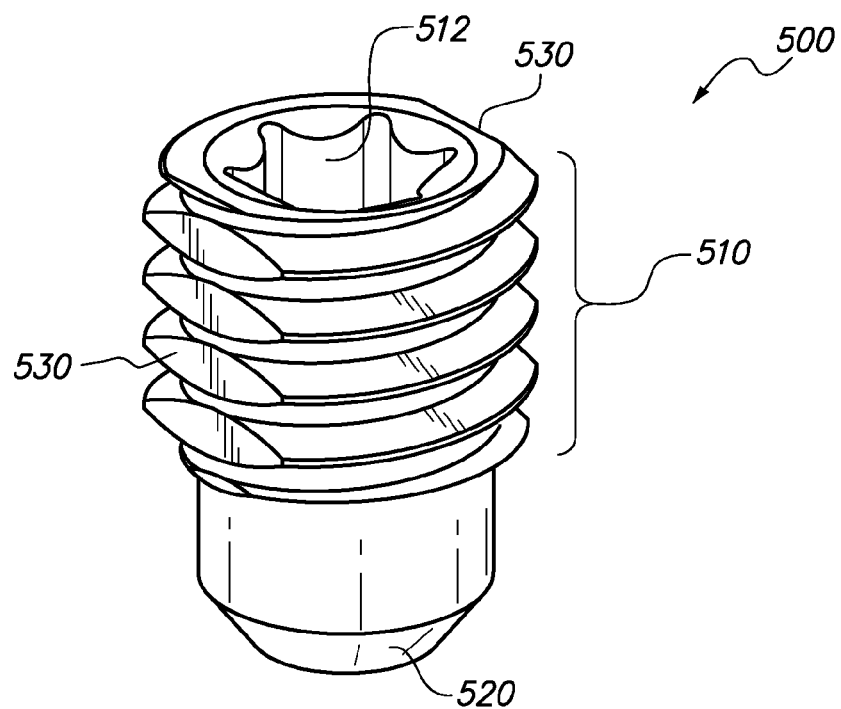
FIG. 5 is a perspective view of a fill port valve according to another embodiment of the present invention.

FIG. 5 is a perspective view of a fill port valve 500 according to another embodiment of the present invention. The fill port valve 500 includes an externally threaded section 510 and an external annular seating surface 520. The external annular seating surface 520 of the fill port valve 500 may optionally be a beveled (i.e. linearly tapered in cross-section) surface or alternatively a curved (e.g. spherical) surface. The fill port valve 500 also optionally includes a faceted torque-receiving recession 512, which in the embodiment of FIG. 5 is a blind recession.

In the embodiment of FIG. 5, the fill port valve 500 also includes a plurality of gas flow channels 530, each of which spans the externally threaded section 510 (traversing the threads as shown in FIG. 5). In the embodiment of FIG. 5, the gas flow channels 530 are external longitudinal grooves formed by locally grinding or milling down the threads of the threaded section 510. In this way, the gas flow channels 530 reduce the resistance to gas flow that would otherwise be presented by the threads at their locations. Note that the gas flow channels 530 do not extend to and do not extend beyond the external annular seating surface 520 of the fill port valve 500.

Figure 6A:
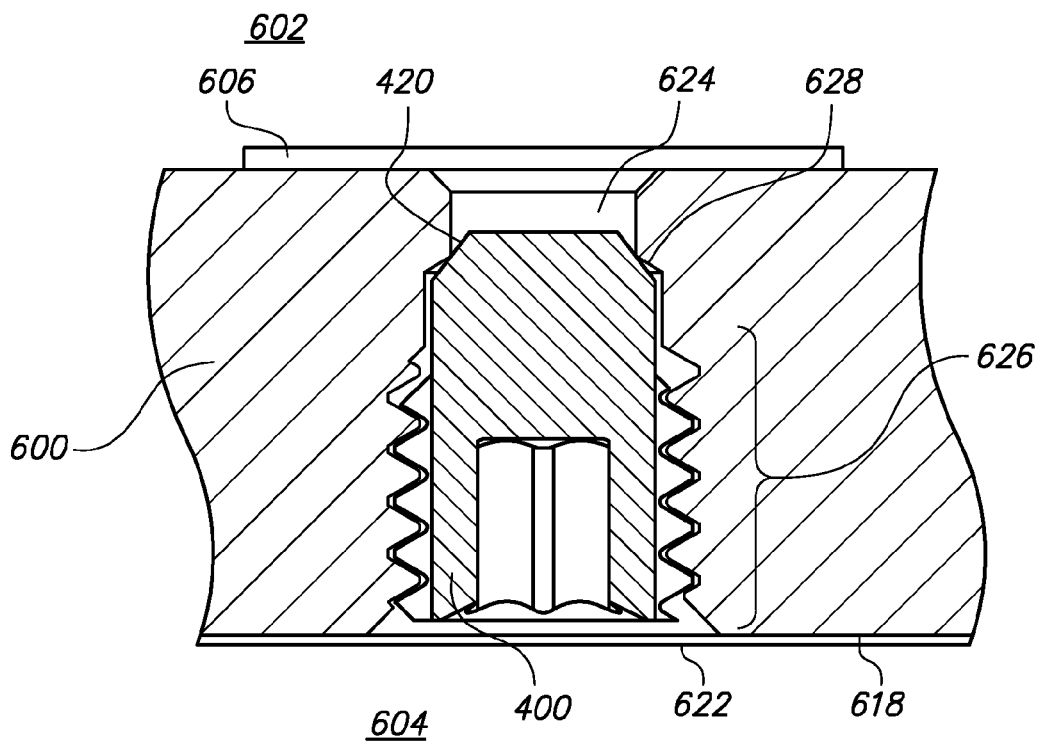
FIG. 6A is a cross-sectional view of a fill port valve in a closed position, according to an embodiment of the present invention.
Figure 6B:
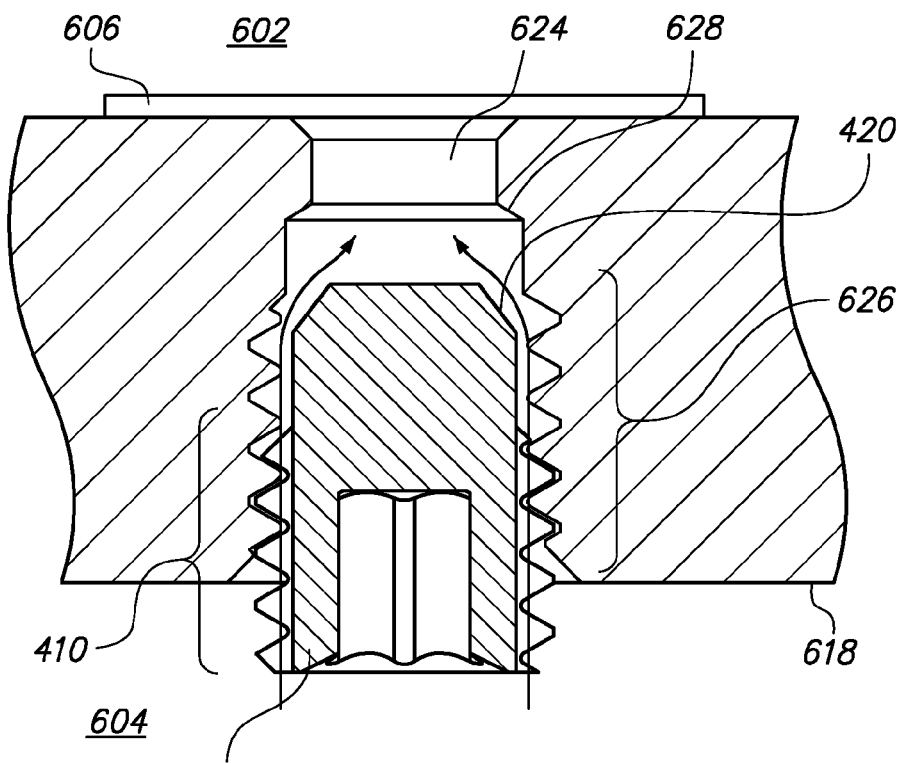
FIG. 6B is a cross-sectional view of the fill port valve of FIG. 6A, except in an open position.

FIG. 6A is a cross-sectional view of the fill port valve 400 in a closed position, according to an embodiment of the present invention. FIG. 6B is a cross-sectional view of the fill port valve 400 in an open position. Now referring to FIGS. 4, 6A, and 6B, a fill port opening 624 includes an internally threaded section 626 and an internal annular seating surface 628. The externally threaded section 410 of the fill port valve 400 is engaged with the internally threaded section 626 of the fill port opening 624. The internal annular seating surface 628 of the fill port opening 624 is preferably but not necessarily a beveled (i.e. linearly tapered in cross-section) surface.

In the embodiment of FIGS. 4, 6A, and 6B, since the gas flow channel 430 does not extend to and does not extend beyond or span or bypass the external annular seating surface 420 of the fill port valve 400, the fill port valve 400 can prevent gas flow in the closed position (shown in FIG. 6A). In the embodiment of FIGS. 6A and 6B, a gas-permeable filter 606 optionally spans the fill port opening 624. When the fill port valve 400 is in the open position, as shown in FIG. 6B, gas may flow into the interior 602 of the disk drive enclosure 600 as shown by the depicted arrows, or out to the exterior 604 of the disk drive enclosure 600 (which would be a flow in the opposite direction than shown by the depicted arrows), through the gas-permeable filter 606.

However, when the fill port valve 400 is in the closed position, as shown in FIG. 6A, the external annular seating surface 420 of the fill port valve 400 contacts with and forms a continuous annular seal with the mating internal annular seating surface 628 of the fill port opening 624. In such position, the contact of the external annular seating surface 420 of the fill port valve 400 with the internal annular seating surface 628 of the fill port opening 624, prevents any flow of gas.

Note that in the embodiment of FIGS. 6A and 6B, the internally threaded section 626 of the fill port opening 624 is disposed closer to the exterior 604 of the disk drive enclosure 600 than is the continuous annular seal (between the external annular seating surface 420 of the fill port valve 400 and the internal annular seating surface 628 of the fill port opening 624). After the fill port valve 400 is closed, as shown in FIG. 6A, an adhered seal 622 may optionally cover the fill port opening 624 and the fill port valve 400. The adhered seal 622 is shown in FIG. 6A to be adhered to an external surface 618 of the disk drive enclosure 600.

Figure 7:
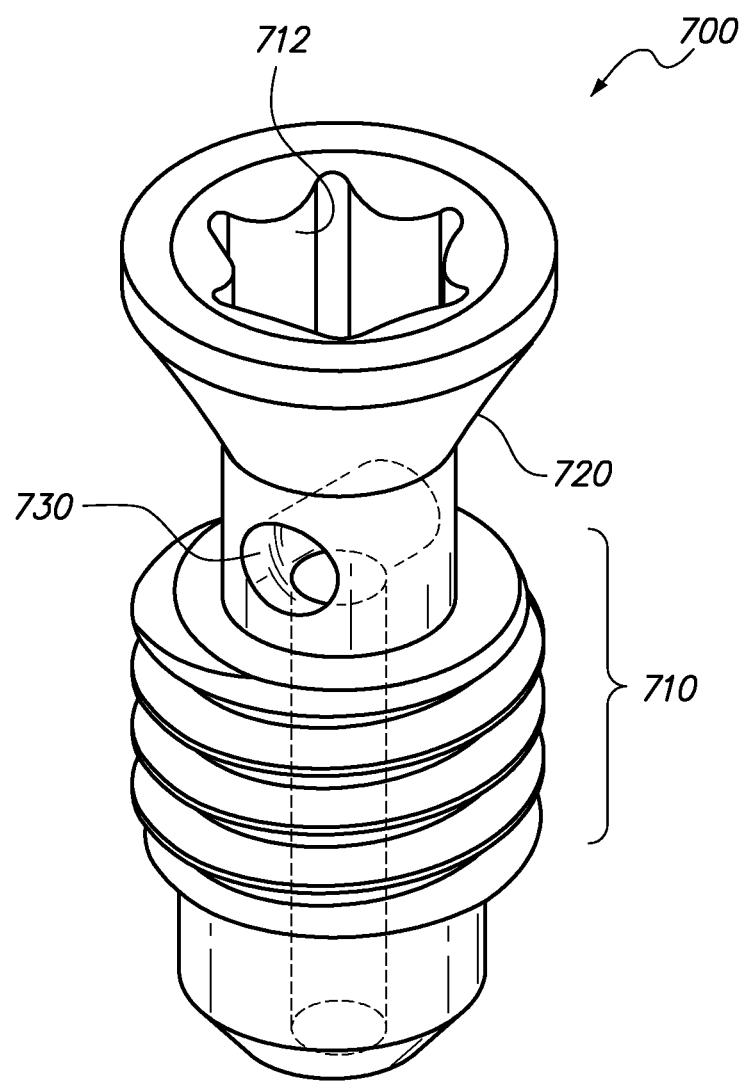
FIG. 7 is a perspective view of a fill port valve according to another embodiment of the present invention.

FIG. 7 is a perspective view of a fill port valve 700 according to another embodiment of the present invention. The fill port valve 700 includes an externally threaded section 710 and an external annular seating surface 720. The external annular seating surface 720 of the fill port valve 700 may optionally be a beveled (i.e. linearly tapered in cross-section) surface or alternatively a curved surface. In the embodiment of FIG. 7, the fill port valve 700 also includes a gas flow channel 730. The fill port valve 700 also optionally includes a faceted torque-receiving recession 712, which in the embodiment of FIG. 7 is a blind recession.

Figure 8A:
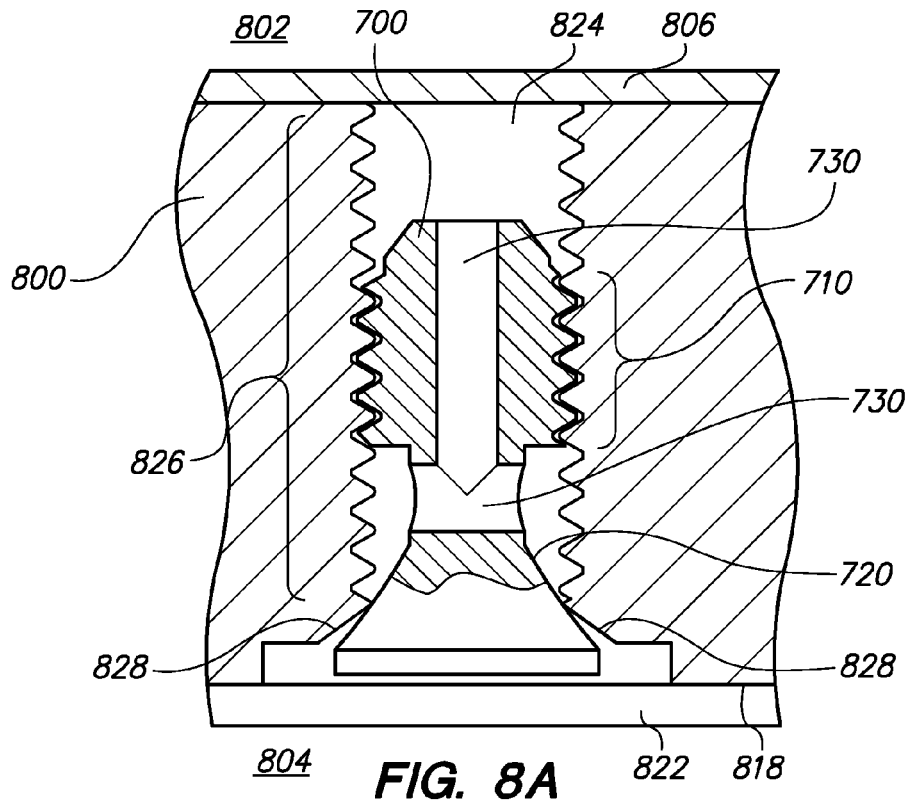
FIG. 8A is a cross-sectional view of a fill port valve in a closed position, according to an embodiment of the present invention.
Figure 8B:
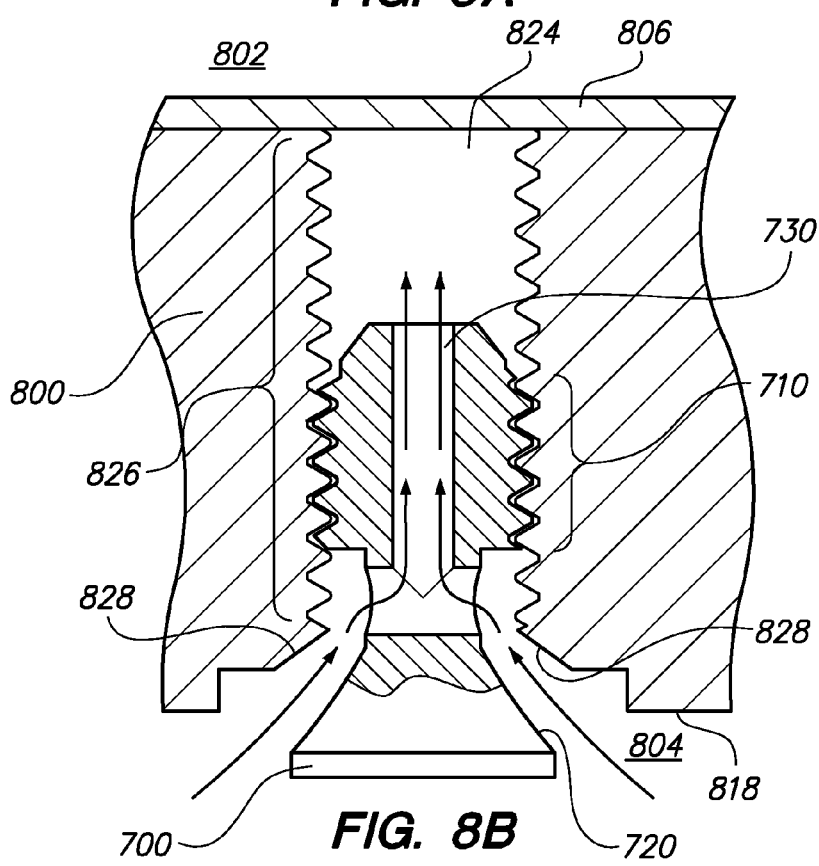
FIG. 8B is a cross-sectional view of the fill port valve of FIG. 8A, except in an open position.

FIG. 8A is a cross-sectional view of the fill port valve 700 in a closed position, according to an embodiment of the present invention. FIG. 8B is a cross-sectional view of the fill port valve 700 in an open position. Now referring to FIGS. 7, 8A, and 8B, a fill port opening 824 includes an internally threaded section 826 and an internal annular seating surface 828. The externally threaded section 710 of the fill port valve 700 is engaged with the internally threaded section 826 of the fill port opening 824. The internal annular seating surface 828 of the fill port opening 824 is preferably but not necessarily a beveled (i.e. linearly tapered in cross-section) surface.

In the embodiment of FIGS. 7, 8A, and 8B, the gas flow channel 730 spans the externally threaded section 710 of the fill port valve 700. In this context to "span" the externally threaded section 710 means to traverse the externally threaded section 710, so as to bypass the externally threaded section 710. In the embodiment of FIGS. 7, 8A, and 8B, the gas flow channel 730 includes an internal bore that passes through the fill port valve 700, within the externally threaded section 710. Note that the gas flow channel 730 does not extend to and does not extend beyond or span or bypass the external annular seating surface 720 of the fill port valve 700, as otherwise the fill port valve 700 could not prevent gas flow in the closed position (shown in FIG. 8A).

In the embodiment of FIGS. 8A and 8B, a gas-permeable filter 806 optionally spans the fill port opening 824. When the fill port valve 700 is in the open position, as shown in FIG. 8B, gas may flow into the interior 802 of the disk drive enclosure 800 as shown by the depicted arrows, or out to the exterior 804 of the disk drive enclosure 800 (which would be a flow in the opposite direction than shown by the depicted arrows), through the gas-permeable filter 806.

However, when the fill port valve 700 is in the closed position, as shown in FIG. 8A, the external annular seating surface 720 of the fill port valve 700 contacts with and forms a continuous annular seal with the mating internal annular seating surface 828 of the fill port opening 824. In such position, the contact of the external annular seating surface 720 of the fill port valve 700 with the internal annular seating surface 828 of the fill port opening 824, prevents any flow of gas.

Note that in the embodiment of FIGS. 8A and 8B, the continuous annular seal (between the external annular seating surface 720 of the fill port valve 700 and the internal annular seating surface 828 of the fill port opening 824) is disposed closer to the exterior 804 of the disk drive enclosure 800 than is the externally threaded section 710 of the fill port valve 700. After the fill port valve 700 is closed, as shown in FIG. 8A, a further adhered seal 822 may optionally cover the fill port opening 824 and the fill port valve 700. The adhered seal 822 is shown in FIG. 8A to be adhered to an external surface 818 of the disk drive enclosure 800.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
    a disk drive enclosure having a fill port opening, the fill port opening including an internally threaded section and an internal annular seating surface;
    a disk rotatably mounted to and within the disk drive enclosure;
    a fill port valve within the fill port opening, the fill port valve including
        an externally threaded section that is engaged with the internally threaded section of the fill port opening,
        an external annular seating surface in contact with and forming a continuous annular seal with the internal annular seating surface of the fill port opening, and
        a gas flow channel spanning the externally threaded section of the fill port valve.

2. The disk drive of claim 1 wherein a metal foil covers the fill port opening and the fill port valve and is externally adhered to the disk drive enclosure.

3. The disk drive of claim 2 wherein the metal foil is a disk drive cover seal.

4. The disk drive of claim 1 wherein the external annular seating surface of the fill port valve is a beveled surface.

5. The disk drive of claim 1 wherein the internal annular seating surface of the fill port opening is a beveled surface.

6. The disk drive of claim 1 wherein the disk drive enclosure has an interior and an exterior, and wherein the continuous annular seal is disposed closer to the exterior of the disk drive enclosure than is the externally threaded section of the fill port valve.

7. The disk drive of claim 1 wherein the disk drive enclosure has an interior and an exterior, and wherein the internally threaded section of the fill port opening is disposed closer to the exterior of the disk drive enclosure than is the continuous annular seal.

8. The disk drive of claim 1 wherein the gas flow channel includes an internal bore that passes through the fill port valve within the externally threaded section, and does not extend to and does not extend beyond the external annular seating surface of the fill port valve.

9. The disk drive of claim 1 wherein the gas flow channel comprises a longitudinal outer groove that traverses the externally threaded section of the fill port valve, and does not extend to and does not extend beyond the external annular seating surface of the fill port valve.

10. The disk drive of claim 1 wherein the disk drive further comprises a gas-permeable filter that spans the fill port opening.

11. The disk drive of claim 1 wherein the disk drive enclosure has a thickness adjacent the fill port opening that is at least 2 mm.

12. The disk drive of claim 1 wherein the disk drive enclosure is helium-filled.

* * * * *